United States Patent [19]
French et al.

[11] 4,089,586
[45] May 16, 1978

[54] SINGLE MODE OPTICAL TRANSMISSION LINE

[75] Inventors: William George French, Plainfield; G. William Tasker, Summit, both of N.J.

[73] Assignee: Bell Telephone Laboratories, Incorporated, Murray Hill, N.J.

[21] Appl. No.: 699,070

[22] Filed: Jun. 23, 1976

[51] Int. Cl.² .............................................. G02B 5/14
[52] U.S. Cl. .................. 350/96.30; 350/96.34
[58] Field of Search .............. 350/96 WG, 96 M; 65/DIG. 7

[56] References Cited

U.S. PATENT DOCUMENTS

| 3,806,224 | 4/1974 | MacChesney | 350/96 WG |
| 3,966,300 | 6/1976 | Bernsee | 350/96 WG X |

FOREIGN PATENT DOCUMENTS

| 2,524,335 | 12/1975 | Germany | 350/96 WG |

Primary Examiner—John K. Corbin
Assistant Examiner—Rolf Hille
Attorney, Agent, or Firm—George S. Indig; Richard D. Laumann

[57] ABSTRACT

A single mode optical transmission line consisting of a core and a clad, both formed from essentially the same type of multicomponent glass, e.g. borosilicate, for use with electromagnetic energy having a wavelength between 0.5μm and 2.0μm. The core has a higher refractive index than the clad because the relative concentrations of the constituents of the glass composition are varied between core and clad, e.g., the ratio of $SiO_2/B_2O_3$ concentrations is higher in the core than in the clad.

6 Claims, 4 Drawing Figures

SINGLE MODE OPTICAL TRANSMISSION LINE

BACKGROUND OF THE INVENTION

1. Field of the Invention

This invention is concerned with glass transmission lines for electromagnetic energy having wavelengths in the visible or near visible spectra.

2. Description of the Prior Art

The potentialities of communications systems having large bandwidth, important in regions with high traffic density where increased communications capacity is desired, and small size, important in congested areas where space is at a premimum, have led to exploration of the feasibility of optical communications systems. While many transmission media have been proposed, those using glass transmission lines for electromagnetic energy in the visible or near visible spectra, i.e., in the region between 0.5μm and 2.0μm, appear most promising. In addition to extensive work done on techniques for injecting and extracting energy from the transmission lines, much work has been done on the composition and fabrication of glass fibers suitable for transmission lines. Most guiding fibers desirably have low losses from scattering and absorption and low dispersion. These losses are undesirable because they reduce the amount of transmitted energy and thereby, for a given level of injected power and receiver sensitivity, reduce the maximum fiber length possible, or for a given fiber length, require either more injected power or more sensitive receivers. Dispersion is undesirable for long fiber lengths or high data rates because it causes time broadening of light pulses as they travel along the fiber which, if sufficiently large, causes pulses to overlap and thereby precludes useful communication. Guiding is obtained with a transmission line having a core surrounded by a clad of slightly lower refractive index. The most promising compositions for the core and clad are presently silica and modified silica compositions. The core and clad may have radially uniform or varying refractive indices.

The major absorption loss is from impurity absorption, usually transition metal ion or OH radical, and is controlled by reducing impurity concentrations. The transition metal ion concentration is desirably less than $10^{-5}$ percent by weight. The OH absorption is centered around a wavelength of about 0.95μm and is due to the third harmonic of an absorption band near 0.273 μm. For operation near 1.0μm, OH content is desirably less than 0.2 percent by weight. The scattering loss, at low power levels, is primarily from thermal fluctuations of the constituent atoms of the glass that are frozen when the glass cools below the glass transition temperature and cause density, and therefore refractive index, variations within the glass. This scattering, usually referred to as Rayleigh scattering is an intrinsic property of the material used and cannot be eliminated. It does, however, have a $1/\lambda^4$ dependence and losses from Rayleigh scattering decrease rapidly as the wavelength increases. An additional scattering loss often results when an oxide is added to glass to increase the refractive index of the core, as is often done, and there are concentration fluctuations of the oxide that cause refractive index variations and scattering losses.

Pulse spreading is primarily caused by material and modal dispersion. The former occurs when the refractive index of the glass varies with the wavelength of the light transmitted. The different frequency components of the light then have different velocities within the fiber and take different amounts of time to traverse a length of fiber. The latter occurs when different modes require different amounts of time to traverse a length of fiber because they have different paths along the core and accordingly, generally require different amounts of time to traverse a given length of fiber. Attempts to reduce modal dispersion have concentrated on obtaining a radially decreasing refractive index that causes the average modal velocity to increase as the modal path length increases. The increased velocity compensates for the increased path length and all modes, therefore, traverse a given length of fiber in the same time. Although these attempts have significantly reduced modal dispersion, they have not been completely successful because of theoretical and experimental difficulties encountered in producing required variation in refractive index.

Since even with the optimum radial variation in refractive index, modal dispersion is important, and because even slight deviations from the optimum cause modal dispersion to increase dramatically, there has been renewed interest in the use of single mode optical fibers which, by definition, lack modal dispersion. It may be shown, see, e.g., *Proceedings of the IEEE*, December 1973, pp. 1703-1751, that a fiber will propagate only a single mode when $V = Ka\sqrt{2n\Delta n} < 2.405$ where $K = 2\pi/\lambda$, $a$ is the core radius, $n$ is the refractive index of the core and $\Delta n$ is the difference between the refractive indices of the core and clad. Thus, as the core radius increases, $\Delta n$ must decrease and vice versa. For practical fibers, the core radius must lie within a fairly well defined region. Very real difficulties encountered in splicing fibers with small cores make large cores desirable. However, large cores require small values of $\Delta n$ which tend to make the fibers lossy. Even for the smallest practical radii for single mode fibers, the difference in the refractive indices of the core and clad is small. As an example, if $\lambda = 1\mu m$, $a = 5\mu m$ and $n = 1.5$; $\Delta n$ is less than $2 \times 10^{-3}$. For multimode fibers, $\Delta n$ is typically between $(8 \text{ and } 20) \times 10^{-3}$.

Prior single mode fibers have produced the required difference in refractive index between core and clad with either a silica core and a borosilicate clad, or a doped silica or doped borosilicate core and a silica or borosilicate clad. These compositions have drawbacks when fabrication techniques are considered. The first composition requires, because of the need for a very small change in refractive index between the pure silica core and borosilicate clad, a very low $B_2O_3$ concentration in the clad. The low $B_2O_3$ concentration is difficult to achieve because of difficulties in accurately maintaining the flow rate of the boron containing constituent when the chemical vapor deposition (CVD) or modified chemical vapor deposition (MCVD) techniques are used. Adding an index increasing dopant to a silica or borosilicate core, as is done for the second compositions, is not completely satisfactory because accurately controlling the small amount of dopant necessary for the difference in refractive indices is difficult. In addition, the dopant will lead to concentration fluctuations that may cause scattering losses. With some dopants, loss of dopant from the core because of its relative volatility constitutes a further problem. Much of the electromagnetic energy in single mode fibers travels in the clad rather than the core because of the small change in refractive index and the clad must have (1) sufficient thickness that the electromagnetic field has essentially zero magnitude at its outer radius to eliminate radiation or absorption by a covering material and (2) very low losses. With prior art compositions, it was difficult to deposit sufficient silica for adequate clad thickness because the substrate tube in which the deposition occurred collapsed at the high deposition temperatures needed. The problems associated with silica clads can not be eliminated, at the present time, by using commercially available silica tubing because the impurities in such tubing cause prohibitively high loss clads.

SUMMARY OF THE INVENTION

A single mode glass transmission line for electromagnetic energy having a wavelength between $0.5\mu m$ and $2.0\mu m$. The core is surrounded by a clad which has a refractive index smaller than that of the core. Both core and clad consist essentially of the same type of multicomponent glass composition and the relative concentrations of the components in the core and clad permit only single mode propagation. The components are selected from the group consisting of $P_2O_5$, $B_2O_3$, $Al_2O_3$, $GeO_2$ and $SiO_2$. As an example, the core and clad consist essentially of a borosilicate composition with the ratio of $SiO_2/B_2O_3$ concentrations in both core and clad being within the range from 3:1 to 30:1. The ratio in the core exceeds the ratio in the clad by an amount such that the difference between the refractive indices of core and clad is less than approximately $3\lambda^2/(4\pi^2 a^2 n^2)$ where $\lambda$ is the wavelength, $a$ is the core radius and $n$ is the index of refraction of the core.

DETAILED DESCRIPTION

It has not hitherto been realized that single mode fibers could be fabricated with both core and clad consisting essentially of the same type of multicomponent glass composition and the refractive index difference between core and clad obtained by varying the relative concentrations of the components, selected from the group consisting of $P_2O_5$, $GeO_2$, $Al_2O_3$, $B_2O_3$ and $SiO_2$, of the glass composition. As an example, a single mode fiber is fabricated with both core and clad consisting of a borosilicate glass and the required index difference between core and clad obtained by varying the ratios of $SiO_2/B_2O_3$ concentrations in the core and clad. These compositions permit accurate control of the composition of the core and clad and because of the relatively high boron content in the clad, deposition of sufficient clad thickness is easy because of the low deposition temperature. Preforms, from which the fibers are drawn, with these compositions are easier to collapse and the drawn fibers have no drawing induced absorption near $0.63\mu m$ such as described in *Journal of the Optical Society of America* 64 pp. 475–481, April 1974.

Figure 1:
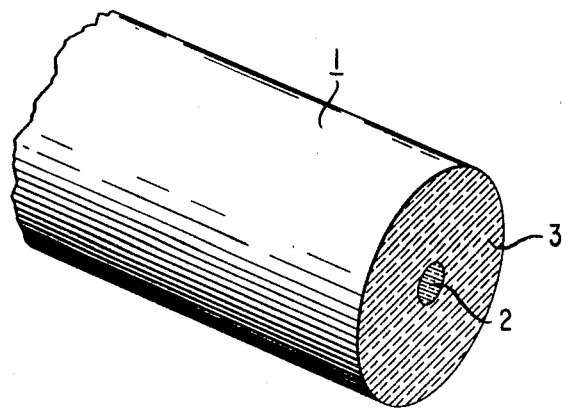
FIG. 1 is a perspective view of a section of a glass transmission line.

FIG. 1 is a perspective view of an optical transmission line 1, i.e., an optical fiber, of this invention having a core 2 and a clad 3. Both core 2 and clad 3 consist essentially of the same type of glass composition, e.g., $B_2O_3$ modified $SiO_2$, i.e., a borosilicate glass. Not shown are the means for injecting light into the fiber and means for extracting and detecting light from the fiber. Since it is generally anticipated that a plurality of fibers will be used, the fiber may be covered with additional layers (not shown), e.g., of a highly absorbent material to prevent crosstalk between adjacent fibers or with another glassy layer from the fabrication method.

Figure 2:
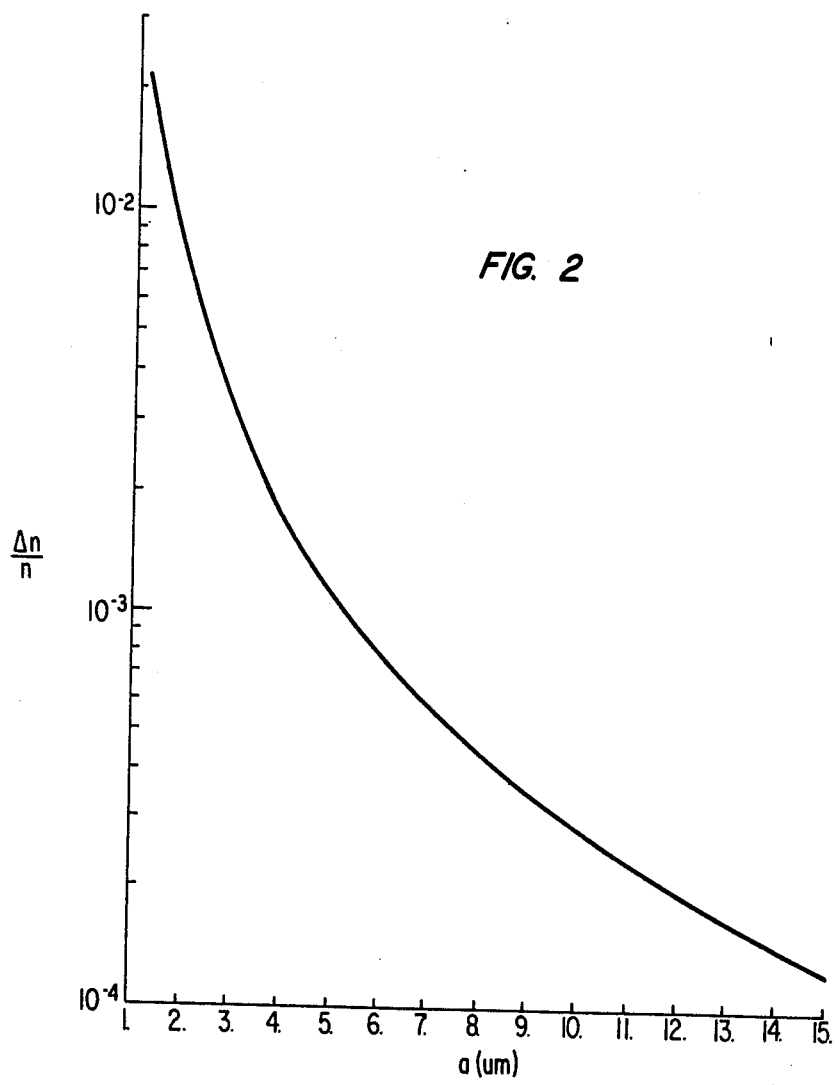
FIG. 2 is a plot of the single mode condition for $\lambda = 0.9\mu m$ and $V = 2.40$ in terms of $\Delta n/n$ versus core radius.

Although, in general, exact solutions for the electromagnetic field within an optical fiber cannot be obtained, for the very practical case of a fiber having a circular cross section and a difference between the refractive indices of core and clad much less than one, approximate solutions can be obtained. From these solutions, it is determined that the single mode condition $V = Ka\sqrt{2N\Delta n} < 2.405$, where $K = 2\pi/\lambda$, $a$ is the core radius, $n$ is the refractive index of the core and $\Delta n$ is the difference between the refractive indices of the core and clad, must be satisified if there is to be single mode propagation within a fiber. Theoretically, there is no mimimum V value and there will be single mode propagation for even the lowest frequencies, provided the wavelength does not exceed the core radius, and largest core radii. There are two reasons for making fibers with V as close to 2.405 as possible. First, as V decreases, more and more of the electromagnetic field energy is within the clad and effective guidance becomes more difficult as the energy within the clad tends to escape from the fiber. Second, because fiber splicing becomes more difficult as the core radius decreases, it is desirable to make the core as large as practicable, i.e., have V as close to 2.405 as possible. FIG. 2 plots, for $V = 2.4$ and $\lambda = 0.9\mu m$, the single mode condition with parameters of $\Delta n/n$ and core radius in $\mu ms$. All fibers having both $\Delta n/n$ and $a$ values below the curve are single mode fibers for $\lambda = 0.9\mu m$. The curve will shift upward or downward, in an easily ascertainable manner, as $\lambda$ becomes longer or shorter, respectively.

Several important design considerations for fibers are apparent from FIG. 2. Large radii cores, which are desirable to alleviate splicing problems, require fibers with smaller values of $\Delta n/n$, which for radii as large as those of typical multimode fibers, have high losses because any real fiber has small deviations from linearity (microbends) in which electromagnetic energy penetrates further into the clad than it would have otherwise and is lost from the fiber. This places a lower limit on $\Delta n$ of about $10^{-4}$. Further, real fibers have small and periodic perturbations which cause energy to be transferred from one mode to another mode. In a single mode fiber such a mode conversion transfers energy to a mode that is not propagated and is lost. As the core radius increases, the period of the perturbations causing mode conversion both increases and becomes more probable. The resulting mode conversion increases loss and imposes a practical upper limit on core radius of approximately $12\mu m$. The minimum core radius is dictated by two considerations. First, there is the previously mentioned and very real practical problem associated with the necessity for accurately aligning fibers with small cores for splicing to other fibers or connecting to light sources or detectors to prevent energy losses from becoming prohibitively large. Second, there is a fundamental problem of large scattering losses from stimulated Brillouin or Raman scattering when the guided electromagnetic energy exceeds a threshold power density level which is approximately two orders of magnitude higher for Raman than for Brillouin scattering. Below the threshold, there is no scattering loss but above the threshold, the electromagnetic energy is shifted in frequency and lost. From these considerations, a practical lower limit on core radius is approximately 3μm.

There is an additional design consideration for fibers with small $\Delta n$ values. In these weakly guiding fibers, the electromagnetic field extends a significant distance into the clad. As a consequence, unless the clad is sufficiently thick so that the magnitude of the radially decreasing electromagnetic field is essentially zero at the outer radius of the clad there will be significant losses. If the electromagnetic field magnitude is non-zero at the outer radius, energy will be lost either through radiation or interaction with an absorbing layer convering the fiber. This type of loss is also responsible for microbending losses. A useful minimum radius for the clad is approximately six times that of the core radius.

Figure 3:
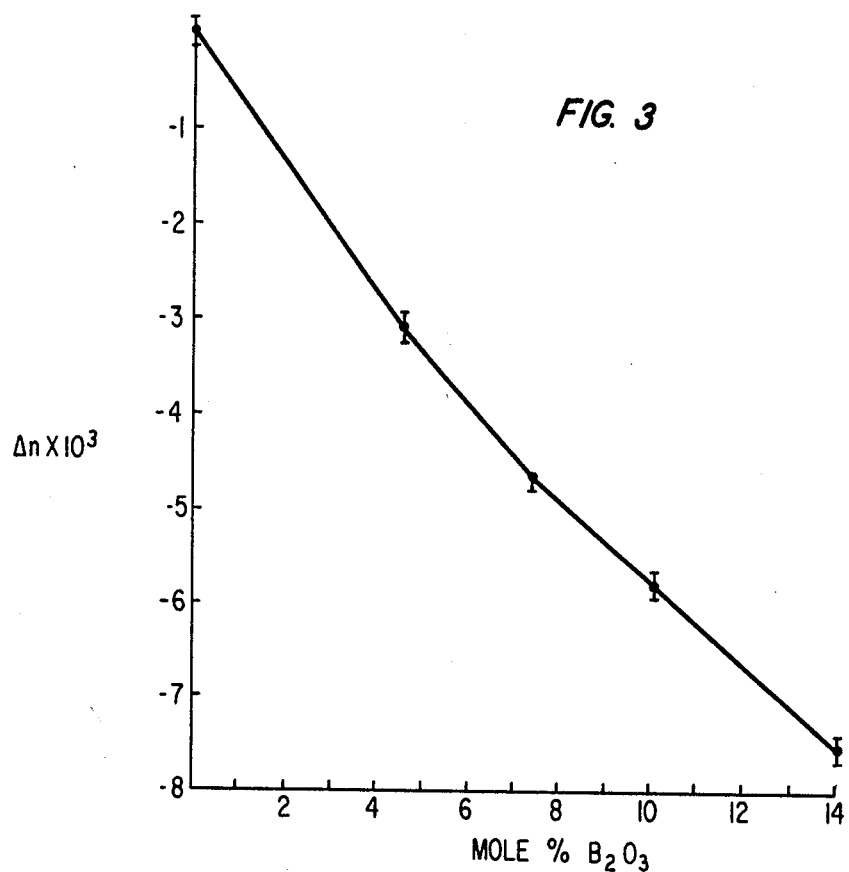
FIG. 3 is a plot showing the decrease in refractive index as the mole percent of $B_2O_3$ in the fiber increases.

The refractive indices of the core and clad are determined by the ratio of the $SiO_2/B_2O_3$ concentrations in core and clad. As the $B_2O_3$ concentration increases, i.e., as the ratio of the $SiO_2/B_2O_3$ concentration decreases the refractive index increases as shown in FIG. 3 which plots the decrease, from the value for pure silica, in refractive index of the fiber, as measured after fiber drawing, as the mole percent of $B_2O_3$ increases. These measurements were made near 0.54μm and are fairly representative of the visible and infrared indices. The extremely refractory nature of compositions with high silica content makes 30:1 the highest practical $SiO_2/B_2O_3$ ratio. The susceptibility to water attack of compositions with high $B_2O_3$ concentrations makes the lowest practical ratio approximately 3:1. The preferred range is between 4:1 and 20:1. The necessary change in composition between core and clad is determined by considering the desired core radius, the wavelength of the light transmitted in the fiber and the desire to have V close to 2.405. These considerations determine $\Delta n$ when the refractive index of core or clad is known. As can be seen from FIG. 3, which plots the decrease, as measured in drawn fibers, in refractive index from the value of pure silica as the mole percent concentration of $B_2O_3$ increases, a considerable number of small compositional variations between core and clad yield values of $\Delta n$ that satisfy the single mode condition. The small compositional difference between core and clad resulting from the small value of $\Delta n$ ensures that core and clad have similar thermal expansion properties and alleviates difficulties often encountered in fiber fabrication when the fiber undergoes a rapid and substantial temperature change such as encountered in the fiber drawing process.

The fibers of this invention may conveniently be fabricated by the modified chemical vapor deposition (MCVD) technique. A thin walled hollow fused quartz tube is supported at both ends and rotated in a glass working lathe. A heat source, e.g., an oxy-hydrogen burner, periodically traverses the length of the tube. A gas stream containing controlled amounts of silicon tetrachloride ($SiCl_4$), boron trichloride ($BCl_3$) and oxygen flows through the tube. Reactions occur both at the inner surface of the tube and in the homogeneous gas stream. The former results in a glassy deposit in the heated zone of the glass tube produced by the heat source and the latter produces particles which settle on the inner surface of the tube downstream from the heated zone and are fused to a clear film as the heat source traverses the tube. In this manner, uniform depositions, which ultimately form the core and clad of the fiber, are made along the length of the tube. Typically, the heat source traverse the length of the tube 75 times with the relative concentrations and flow rates of silicon tetrachloride, boron trichloride and oxygen being adjusted, if necessary, after each traversal to obtain the desired change in refractive index between or within core and clad. Unlike optimum multimode fibers, single mode fibers need no radial variation in refractive index in either core or clad, i.e., they may be step index or approximately step index fibers. Typical deposition temperatures are within the ranges of 1450°–1550° C for the clad and 1550°–1650° C for the core with the precise temperatures actually chosen depending upon the composition of the core and clad.

After deposition has been completed, the fused quartz tube with glassy deposits, usually referred to as a preform, is collapsed with a slight positive pressure in the hollow section of the preform to maintain a circular cross section and the deposits form a solid mass. The preform is attached to a feed mechanism that maintains the preform tip accurately positioned with respect to a heat source that softens the tip. After the tip softens and forms a taper, a fiber is drawn from the taper and attached to a drum which both rotates and translates and thus winds a layer of the fiber on the drum. The fiber diameter is controlled by the preform size, the rate of preform feed, the drawing temperature, and the peripheral velocity of the drum in well known manner. In general, the drawing process maintains the ratio between the core and clad radii in the fiber equal to the ratio of the radii of the core and clad deposits in the preform.

Figure 4:
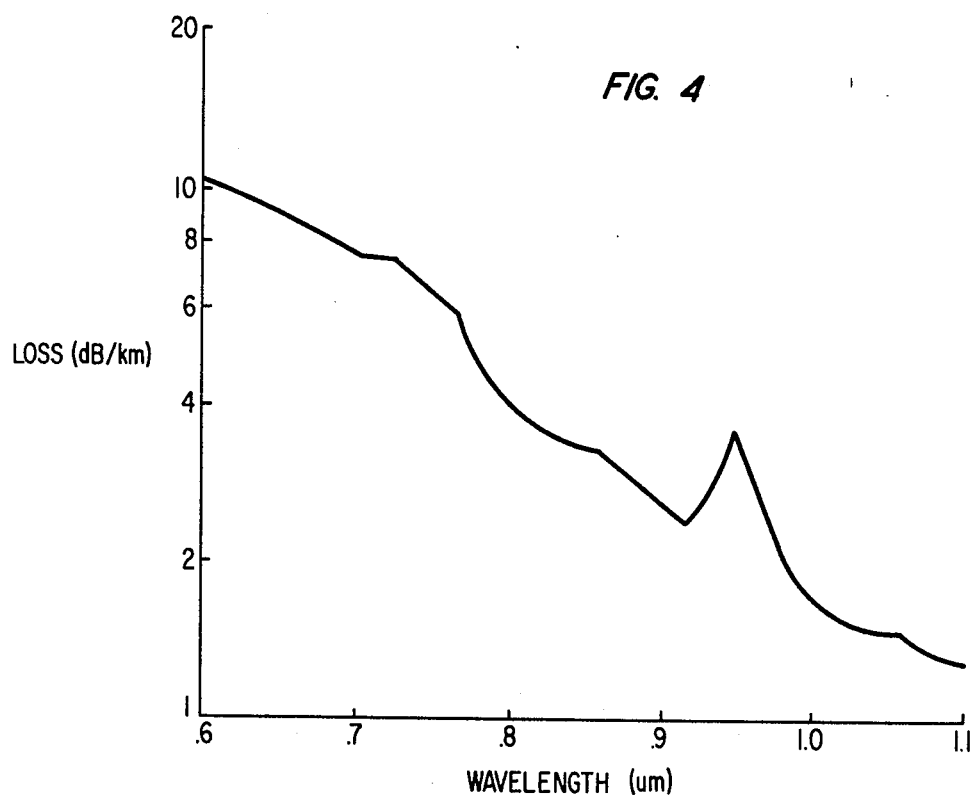
FIG. 4 is a plot of energy loss in db/km versus wavelength for a typical fiber of this invention.

Example: The $B_2O_3$ concentrations in the core and clad were 9.1 and 14.2 mole percent, respectively, with the remaining material being $SiO_2$. $\Delta n$ was 0.0017. The core radius was 4.5μm and the clad radius was 8 times greater. $v$ was less than 2.4 for wavelengths greater than 0.85μm. The loss in electromagnetic energy, in db/km, as a function of wavelength is shown in FIG. 4. The loss decreases generally as expected from the $1/\lambda^4$ dependence of Rayleigh scattering. The increase in loss between 0.9μm and 1.0μm is due to the presence of OH radicals.

For some fibers, $v$ may exceed 2.405 by a small amount, i.e., $v$ may be as large as about 4.0, and although the higher $v$ value theoretically allows modes of order higher than the first to propagate, for practical purposes, these fibers are also single mode fibers because all modes, on other than the lowest order, are rapidly lost from the clad through radiation or absorption by material coating the clad, e.g., another glassy layer.

What is claimed is:

1. A single mode glass transmission line for electromagnetic energy having a wavelength between 0.5μm and 2.0μm, said line consisting essentially of a core having a first refractive index, said core having a radius less than 12μm, and a clad having a second refractive index, said clad surrounding said core, said first refractive index exceeding said second refractive index; characterized in that said core and said clad consist essentially of $SiO_2$ and $B_2O_3$, the ratios of $SiO_2/B_2O_3$ concentrations within said core and said clad being within the range between 3:1 and 30:1, said ratio in said core exceeding said ratio in said clad by an amount such that the difference between said first refractive index and said second refractive index is less than approximately $(2.4\lambda)^2/(8\pi^2 a^2 n)$ where $\lambda$ is said wavelength, $a$ is said radius and $n$ is said first refractive index.

2. Transmission line as recited in claim 1 in which said ratios are within the range from 4:1 and 20:1.

3. Transmission line as recited in claim 1 in which said core has a radius between $3.0\mu$ and $12.0\mu m$.

4. Transmission line as recited in claim 3 in which said clad has a radius at least seven times greater than said radius of said core.

5. Transmission line as recited in claim 1 in which said first refractive index is substantially uniform in the radial direction from the center of said core.

6. Transmission line as recited in claim 1 in which said second refractive index is substantially uniform in the radial direction from the center of said core.

* * * * *